United States Patent [19]

Bremer

[11] Patent Number: 4,663,766

[45] Date of Patent: May 5, 1987

[54] METHOD OF DETERMINING AUTOMATICALLY THE RATE OF DATA SIGNALS IN A MODEM

[75] Inventor: Gordon Bremer, Clearwater, Fla.

[73] Assignee: Paradyne Corporation, Largo, Fla.

[21] Appl. No.: 659,288

[22] Filed: Oct. 10, 1984

[51] Int. Cl.⁴ .............................................. H04L 7/04
[52] U.S. Cl. .................................... 375/13; 375/106; 375/114; 375/121
[58] Field of Search ...................... 370/79, 84; 375/13, 375/108, 111, 114, 116, 121, 122, 106; 178/63 C, 69 M; 328/109, 110; 307/522

[56] References Cited

U.S. PATENT DOCUMENTS 4,001,504  1/1977  Hendrickson ........................ 375/114
4,320,517  3/1982  Godard et al. ......................... 375/13

Primary Examiner—Benedict V. Safourek
Attorney, Agent, or Firm—Kane, Dalsimer, Sullivan, Kurucz

[57] ABSTRACT

A method of determining the data rate of signals received on a communication line is disclosed. The method analyzes the training signals which normally precede each data transmission to determine whether they contain a preselected pattern of phase reversals. The presence or absence of the pattern indicates the data rate.

5 Claims, 5 Drawing Figures

METHOD OF DETERMINING AUTOMATICALLY THE RATE OF DATA SIGNALS IN A MODEM

BACKGROUND OF INVENTION

1. Field of Invention

This invention pertains to digital modems used for exchanging digital data over communication lines.

2. Description of the Prior Art

It has become common practice to use voice-grade channels to transmit data at relatively high rates, such as 4800 b/sec. However, often these channels, characteristics of which are usually beyond the control of end users, are degraded for various reasons so that the rate at which data is transmitted must be reduced in order to maintain an acceptable data error rate. However most modems used, until now, had external controls for switching data rates so that a degradation in channel resulted in an interruption of the exchange of data until the respective receivers could be reset manually to the new data rate. Obviously it would be very advantageous if the receivers of the modems could adjust automatically to the data rates of signals being received.

OBJECTIVES AND SUMMARY OF THE INVENTION

Therefore an objective of this invention is to provide a method which would enable receivers to adjust automatically to new data rates.

Another objective is to provide a modem which can operate at one of several data rates automatically without presetting the modem to any particular rate.

Other objectives and advantages of the invention shall become apparent in the following description of the invention.

It has been standard procedure to precede any data exchange between modems with a training period during which each modem is given time to set its operating parameters such as equalizer coefficients, automatic gain control levels and so forth in accordance with the characteristics of the particular communication channel to be used and, possibly, the other modems. Furthermore, if during data exchange, it is determined that retraining is necessary, the normal data exchange is interrupted and a retraining period is initialized to reset the above-mentioned parameters. More particularly, recommendation V.27-ter of the CCITT (as adopted in Geneva in 1976, and amended in Geneva, 1980), has suggested the following training sequences for channels without echo protection:

| SEQUENCE | SEGMENT 1 (SI)* | SEGMENT 2 (SI)* | SEGMENT 3 (SI)* |
|---|---|---|---|
| A | 14 | 58 | 8 |
| B | 50 | 1,074 | 8 |

*SI = Symbol Intervals

Sequence A is usually identified as a short training sequence and it is normally used for turn-around operation, i.e., when retraining is required in middle of a data transmission period.

Sequence B is normally identified as a long training period and is used when initial communication is established between two modems.

Segment 1 is defined as comprising a series of continuous 180° phase reversals one for each symbol interval. Segment 2 comprises a 2-phase (0°-180°) equalizer conditioning pattern derived from a pseudo-random sequence generated by a polynomial sequence. Segment 3 comprises a sequence of ONES continuously scrambled at the modem data rate. After segment 3 is completed training (or retraining) is terminated and normal transmission of data may begin.

Importantly, the length of the short or long-sequence measured in symbol intervals is the same regardless of the actual data rate of the modem. However recommendation V.27-ter also specifies 1,600 bauds for 4,800 b/s and 1,200 bauds for 2,400 bits per second. In other words for 4,800 b/s, the symbol interval is 0.625 ms, while for 2,400 b/s the symbol interval is 0.833 ms. Consequently the training periods at 2,400 b/s are longer by 33% than the training periods at 4,800 b/s. This difference is used by a receiver according to the present invention to determine the data rate of the received signals. A rate determination circuit is provided within the receiver which comprises means for determining whether at a given moment in time after training has started a particular sequence of signals, such as, for example, segment 3 defined above, has been received. If the sequence has in fact been received at the expected instant of time, than it is assumed that the training signals at the expected data rate has been received. Otherwise it is assumed that the signals are sent at a second data rate and the receiver is reset. Provisions are also made to differentiate between long and short training sequences.

DESCRIPTION OF THE PREFERRED EMBODIMENT

Figure 1:
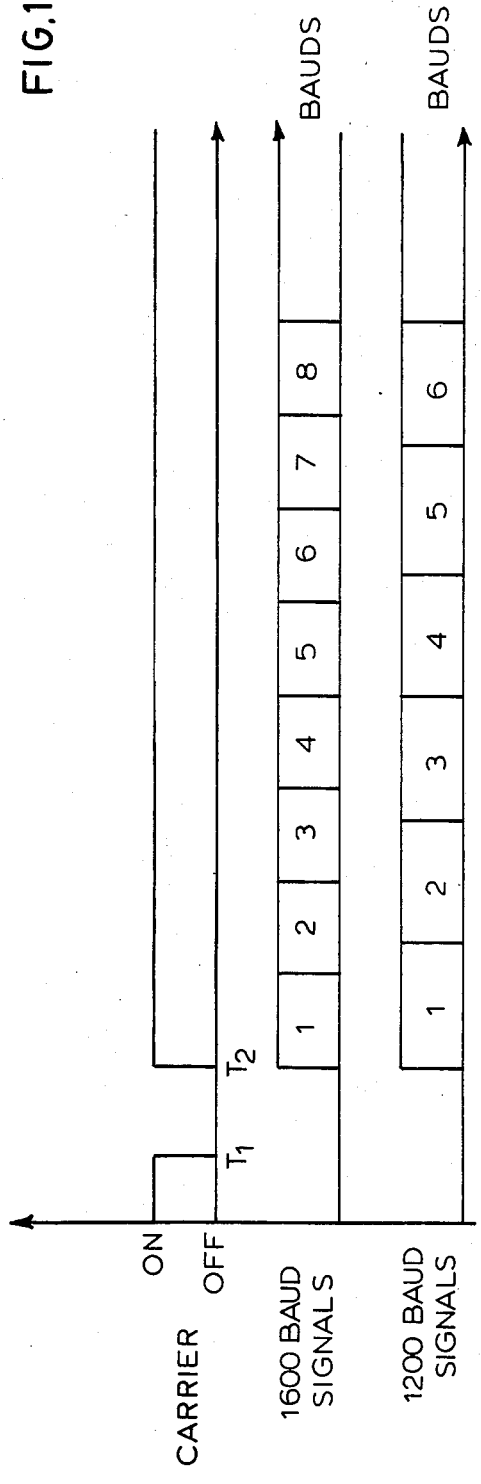
FIG. 1 shows a comparison of training sequences of 1200 and 1600 bauds.
Figure 2:
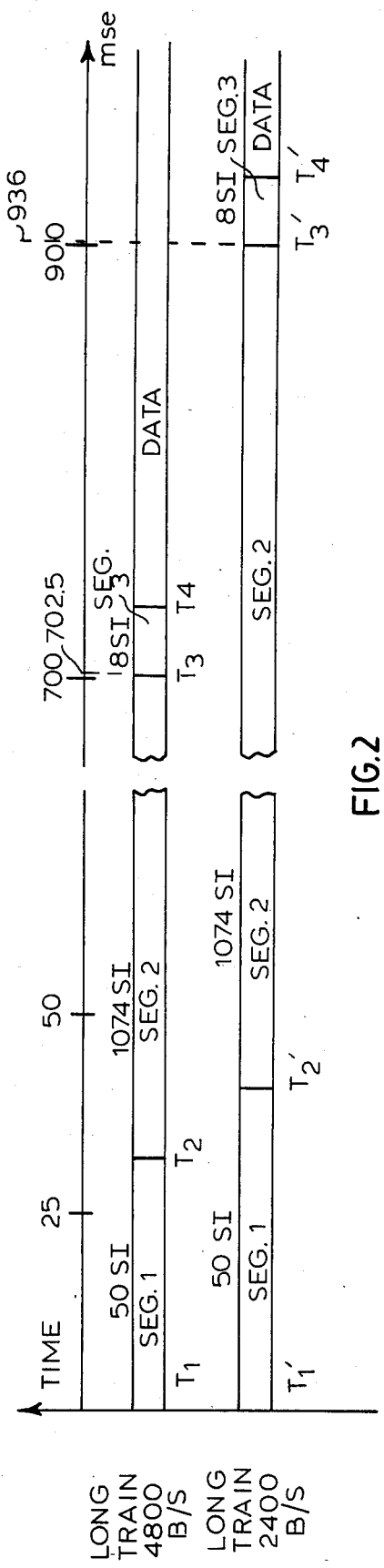
FIG. 2 shows a comparison of the long training sequence at the above mentioned data rates.
Figure 3:
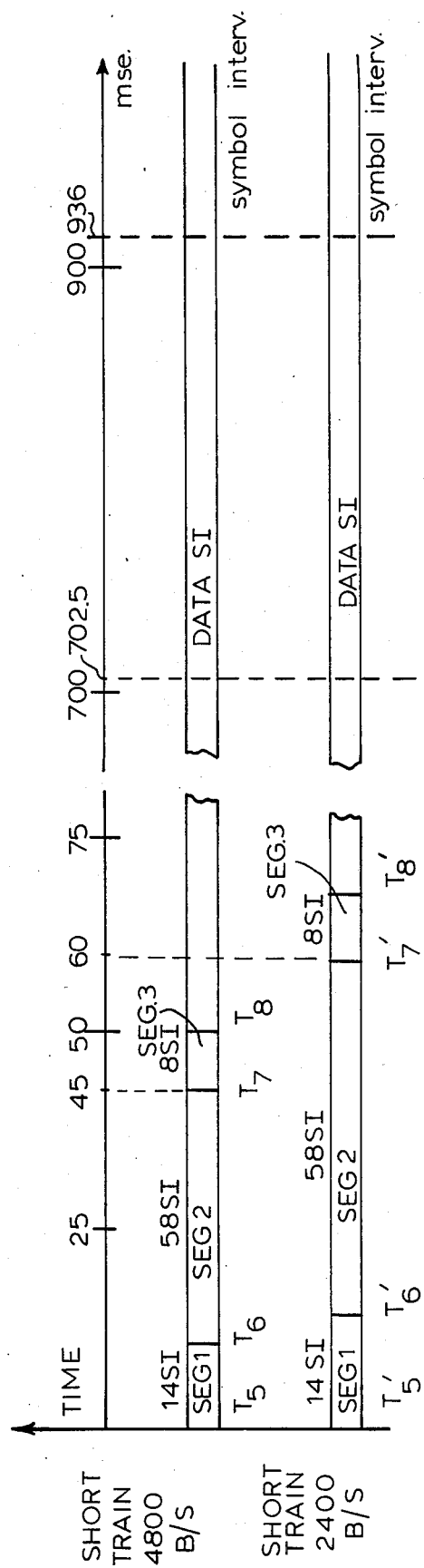
FIG. 3 shows a comparison of the short training sequences at the above-mentioned rates.
Figure 4:
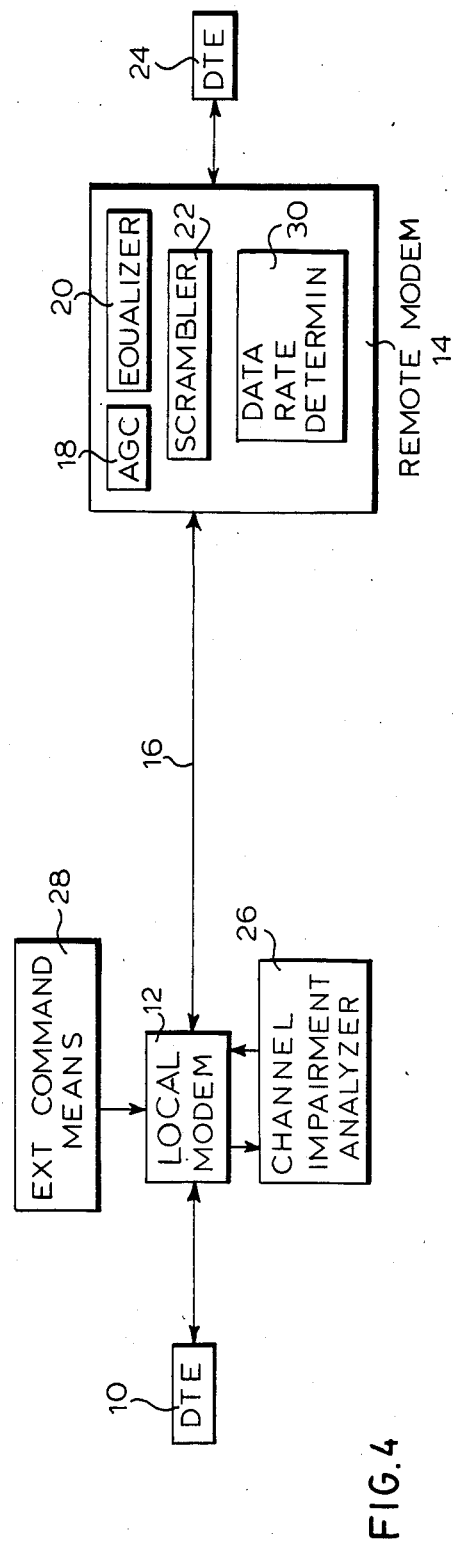
FIG. 4 shows a communication system with a receiver having a data rate determining circuit.

As shown in FIG. 4, data from DTE 10 is sent to a local modem 12 which in response sends corresponding communication signals to remote modem 14 via channel 16. Prior to the sending of data, local modem 12 sends a training signal to remote modem 14 which is used by the remote modem to set the automatic gain control circuit 18, equalizer 20, scrambler 22 and so forth. A channel impairment analyzer 26 may be present, the function of which is to analyze the effect of communication channel impairments on the quality of data communication and, if appropriate, determine if the data rate should be changed. Initially a long training sequence is sent as shown in FIG. 2. At 4800 b/s segments 1, 2 and 3 start at times $T_1$, $T_2$ and $T_3$ respectively. At $T_4$ actual data reception starts. (It should be noted that in order to simplify FIGS. 2 and 3, various propagation delays have been omitted.) At 2,400 b/s the same events start at times $T_1'T_2'$, $T_3'$ and $T_4'$ respectively. The data is sent by the remote modem 14 to DTE 24.

Data transmission may be interrupted at any time by an appropriate command. This command may come from the channel impairment analyzer 26, an external control means 28 or the DTE 10. In response to this command, the local modem interrupts the carrier for a short time and then starts transmitting a new training sequence at either the old or the new data rate.

Figure 5:
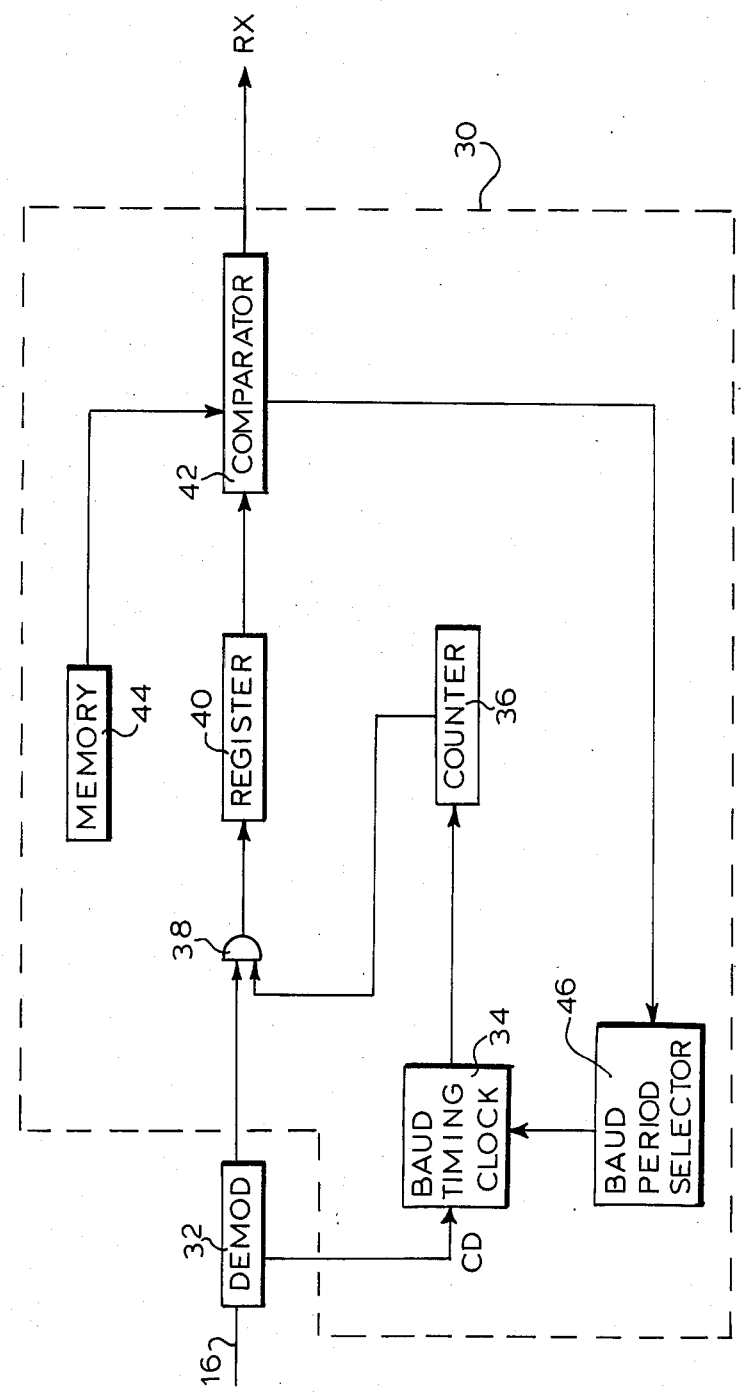
FIG. 5 shows the elements of the data rate determining circuit.

At remote modem 14, a data rate determinator circuit 30 (shown in FIG. 5) starts operating as soon as the carrier is regained. The signals of the training sequence are detected by a demodulator 32 which generates a carrier detect (CD) signal used to initiate the operation of a baud timing clock 34. Originally it is assumed that the old data rate is still valid and the clock 34 outputs pulses of an appropriate duration. These pulses are fed into a counter 36 which counts the pulses of the clock. When the counter reaches a predetermined count, a gate 38 is enabled. Gate 38 in its enabled state sends a preselected number of signals received from the demodulator to a register 40. From the register the signals are sent to a comparator 42 which compares said signals to the corresponding contents of a memory 44. If the signals match, with said contents of the comparator, the data rate has not been changed. In order to use these signals, it is initially assumed that a short training sequence is being sent and accordingly, counter 36 is set to 72. Thus the first 72 symbol intervals are ignored and gate 38 is enabled only during intervals 73–80. The signals received during this period are stored in register 40 and compared in comparator 42 with corresponding signals from 44. If the signals correspond to eight MARK symbol intervals (in accordance with the above-mentioned CCITT recommendation) then obviously the short training sequence at the old data rate has been received. Accordingly a receive data (Rx) signal is generated and the modem is ready for data communication.

If the signals received do not match with the ones in the memory it is assumed that a long training sequence has been received at the remote modem and a signal is sent to a baud period selector circuit 46 which resets the baud timing clock to the other (new) data rate. With reference to FIG. 3 it should be noted that if initially the remote modem expects a 4,800 b/s signal and it determines at $T_8$ that a 2400 b/s has been sent, no data would be lost even if the retraining sequence is a short sequence because, as illustrated in FIG. 3, at $T_8$ the short training sequence is still in the middle of segment 2. However in the reverse situation, if at $T_8'$ it is determined that data has been sent at 4,800 b/s, then it would be too late and some of the data would be lost.

This problem is solved by insuring in the local modem that every new data rate transmission is started with a long training sequence. Therefore even if a short training sequence is expected at 2,400 b/s and a long training sequence is received at 4,800 b/s, an analysis of FIGS. 2 and 3 shows that at $T_8'$ the long sequence is still in the middle of segment 2.

The above-described procedure has been designed to detect change in the data rate after communication transmission has started. However, with a slight modification it may be used to detect a different data rate even while communication between two modems is initialized, i.e. during the long training period. The modified procedure operates as follows. Regardless of whether the carrier has been cut off and started again, or it has been newly detected, initially it is always assumed that a short-training sequence is received at the data rate of the last received communication. After a period corresponding to 72 symbol intervals at the expected rate, the next 8 symbols are compared with data stored in memory 44. If the two sets match, the short training sequence at the expected rate has indeed been received and data transmission may begin.

If the two data sets do not match, then the counter measures out a second time period and a second sequence of symbols is tested. Preferably the second sequence should occur sometime near the beginning of the segment 2 so that (as shown in FIG. 2) no data is lost if it is transmitted at a different rate. For example, the sequence occupying intervals 256–290 may be used. It should be noted that since this second sequence occurs during segment 2 comprising 2-phase reversals, it cannot comprise a series of uninterrupted MARKS. If this second sequence matches a corresponding set of data in memory 44 then the long training sequence at the expected rate has been received. If the two sets do not match then it is assumed that the long training sequence at the other data rate has been sent. The baud timing clock is reset as described above and training continues until it is complete. Naturally after the clock has been reset other symbol counters (not shown) are also reset to the correct symbol count so that the end of the training sequence is properly determined.

For the purposes of this description the data rate determinator has been shown as a separate subassembly of the modem. However it is obvious that in a microprocessor type modem, i.e. a modem in which most signal processing is done by a microprocessor, the functions performed by the determinator of FIG. 5 can be made part of the normal microprocessor operation, by incorporating therein an appropriate subroutine. Such modems are made for example by the Paradyne Corporation of Largo, Fla., under the designation of MP-48.

Obviously numerous modifications may be made to the invention without departing from its scope as defined in the appended claims. For example, if the expected sequence of symbols at a particular time corresponds to a second set of numbers stored in the memory 44 instead of the first set, then instead of going into a data transmission mode, the modem could go into a self-testing mode. Furthermore the above-described procedure could be extended for modems operating at three or more data rates.

What is claimed is:

1. In a data communication system having first and second modems for exchanging data signals at one of a first and a second rate, a method of determining the rate of the signals sent by the first modem comprising:
    a. transmitting a sequence of training signals, said training signals being sent only for the purpose of determining the rate of the signals being sent by the first modem and containing no message data interspersed therein from said first modem said sequence comprising a first segment comprising a series of preselected signals;
    b. detecting said sequence of training signals at said second modem;
    c. initializing a pulse generator which outputs pulses which correspond to the period of training signals having a first data rate;
    d. initializing a timing means which operates form the moment said sequence is first detected for a first pre-selected time period which corresponds to the period of said first segment at said first data rate;
    e. comparing the training signals received after said first segment with a set of stored constants representation of the first data rate to determine whether they correspond to the pre-selected signals of said second segment; and f. changing said pulse generator to generate pulses corresponding to the second rate if said received signals do not correspond to said stored constants.

2. The method of claim 1 wherein each data transmission is preceded by a short training sequence if a previous rate is maintained and a long training sequence if a new rate is used.

3. The method of claim 2 wherein said second segment comprises marks.

4. A method of data communication comprising:
a. sending data signals and a carrier signal from a first modem to a second modem at a first rate said second modem including signal timing means for generating pulses at first intervals corresponding to said first rate;
b. interrupting said carrier signal upon the receiving of an appropriate command by said first modem from a channel impairment analyzer, external control means, or DTE;
c. initiating a sequence of training signals from said first to said second modem at one of said first and a second rate, said second rate being slower than said first rate, said training sequence comprising a first segment and a second segment, said training signals being sent only for the purpose of determining the rate of the signals being sent from the first modem to the second modem and containing no message data interspersed therein;
d. initiating a timing means for a first period corresponding to a training period of said first segment at said first rate;
e. storing a pre-selected number of signals received by said modem after said first period;
f. comparing the stored signals to a set of pre-selected stored signals corresponding to said first rate;
g. changing said signal timing means to generate pulses at second intervals corresponding to said second rate when the stored signals do not correspond to said preset value.

5. The method of claim 1 wherein each training sequence is selected from a group consisting of a short sequence and a long sequence, each including a first and a second segment, comprising:
initiating said timing means for said first period corresponding to a training period of said first short segment at said first rate;
storing a first pre-selected number of signals received by said second modem after said first period;
comparing the stored signals to said first preset value;
storing a second pre-selected number of signals received by said second modem after said second period corresponding to said first long training signal;
comparing said second stored signals to a second preset value; and
changing said signal timing means when said second stored signals do not correspond to said second preset value.

* * * * *